US006798542B1

United States Patent
Kimura et al.

(10) Patent No.: US 6,798,542 B1
(45) Date of Patent: Sep. 28, 2004

(54) IMAGE ENCODING APPARATUS

(75) Inventors: Shunichi Kimura, Nakai-machi (JP);
Yutaka Koshi, Nakai-machi (JP);
Koichiro Shinohara, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/515,891

(22) Filed: Feb. 29, 2000

(30) Foreign Application Priority Data

Mar. 9, 1999 (JP) .......................................... 11-061104

(51) Int. Cl.[7] .............................................. G06K 15/00
(52) U.S. Cl. ................................... 358/3.02; 358/3.12
(58) Field of Search ............................... 358/1.9, 2.99, 358/3.02–3.12, 3.2

(56) References Cited

U.S. PATENT DOCUMENTS

| 5,028,998 | A | * | 7/1991 | Westell ........................ 348/145 |
| 5,467,422 | A | * | 11/1995 | Itihara et al. .............. 358/3.02 |
| 5,515,480 | A | * | 5/1996 | Frazier ........................ 358/1.9 |
| 6,282,323 | B1 | * | 8/2001 | Tanaka et al. ............. 358/3.12 |

FOREIGN PATENT DOCUMENTS

JP    8-223423    8/1996

OTHER PUBLICATIONS

H. Yasuda et al., "International Standard of Multi–media Encoding", 1991 Maruzen, pp. 18–23.
T. Fukinuki, "Digital Signal Processing of Image", 1981 Nikkan Kogyo Shimbunsha, pp. 257–261.
"Halftone Reproduction of Continuous Tone Images in Printing", published in "Imaging Part 1", by Shashin Kogyo Shuppan-sha, 1998, pp. 116–125.

* cited by examiner

*Primary Examiner*—Thomas D. Lee
*Assistant Examiner*—Stephen Brinich
(74) *Attorney, Agent, or Firm*—Morgan Lewis & Bockius LLP

(57) ABSTRACT

Input gray-scale bit map information is inputted to an image forming position extracting unit for extracting image forming position information. An input computer-formed image is inputted to an image forming position extracting unit for generating an image forming position. At an image forming position overlapping unit, two image forming positions are overlapped with each other, and the composed image forming position is sent to a pixel value calculating unit and an image forming position determining unit. The image value calculating unit measures a width of the composed image forming position and converts the measured value into a pixel value. The image forming position determining unit calculates a barycenter of the composed image forming position. The pixel value and the barycenter are sent as image information. Encoding without distortion can be executed by enhancing the precision of the barycenter.

18 Claims, 21 Drawing Sheets

| | |
|---|---|
| ▮▮▮▮▮▮▮▮ | A STRIPE OF A LOW FREQUENCY CAN BE DETECTED AS A STRIPE |
| ▮▮▮▮▮▮▮▮▮▮▮▮▮▮▮▮ | AS THE FREQUENCY BECOMES HIGH, IT IS DIFFICULT TO DETECT AS A STRIPE |
| ∥∥∥∥∥∥∥∥∥∥∥∥∥∥ | A STRIPE IS AVERAGED TO BE SEEN AS A HALF-TONE IN A HIGH FREQUENCY |

| | | |
|---|---|---|
| a | | PIXEL VALUE 64 (POSITION: CENTER) |
| b | | PIXEL VALUE 0 |
| c | | PIXEL VALUE 64 POSITION: LOW RIGHT |
| d | | PIXEL VALUE 128 POSITION: LOWER |
| e | | PIXEL VALUE 192 POSITION: OTHER THAN UPPER |
| f | | PIXEL VALUE 255 |

FIG.7
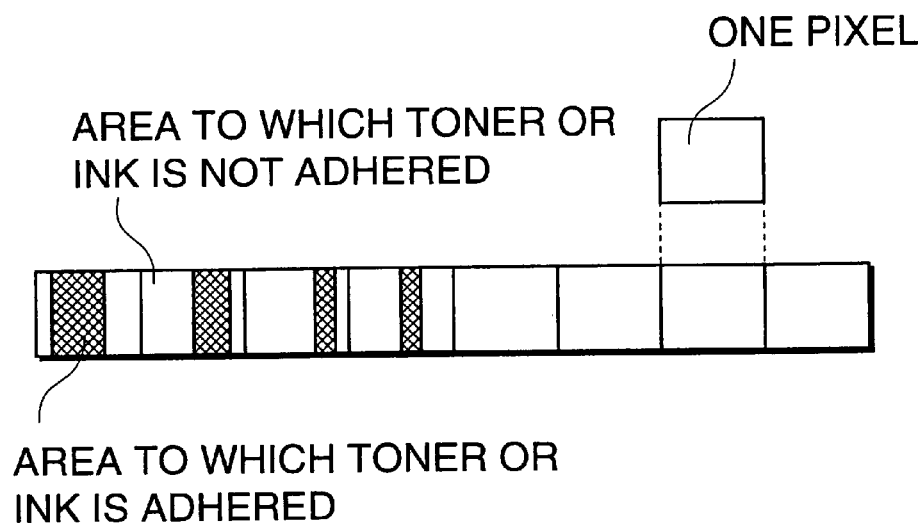
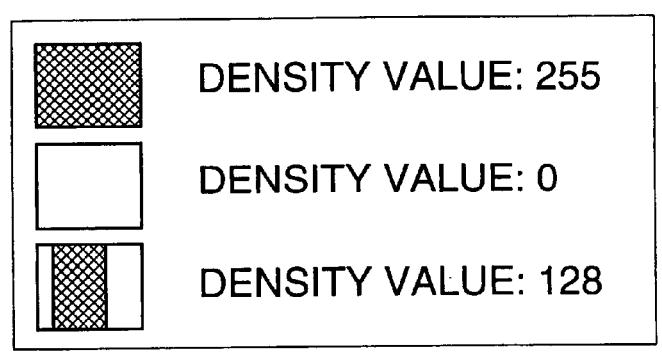

| | |
|---|---|
| | IMAGE FORMING POSITION OF GRAY-SCALE BIT MAP INFORMATION |
| THE POSITION OF THIS EDGE IS DETERMINED WITH A PRECISION OF 1600DPI | IMAGE FORMING POSITION OF COMPUTER-FORMED IMAGE |

BARYCENTER OF THE OVERLAPPED
IMAGE FORMING POSITION

WIDTH OF THE OVERLAPPED
IMAGE FORMING POSITION

FIG.12
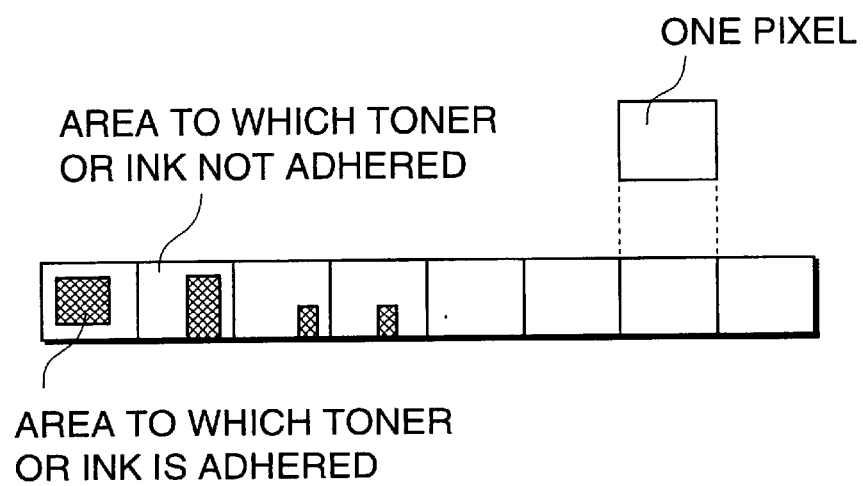
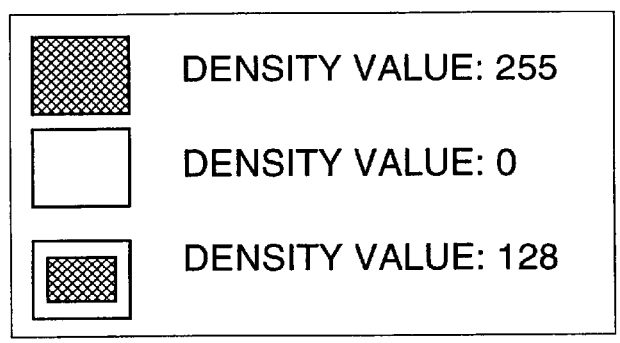

AREA TONE OF PIXEL1
AREA TONE OF PIXEL 2
AREA TONE OF PIXEL 4
AREA TONE OF PIXEL 3

200DPI
400DPI

| | |
|---|---|
| ▨ | IMAGE FORMING POSITION OF GRAY-SCALE BIT MAP INFORMATION |
| ▨<br>THE POSITION OF THIS EDGE IS DETERMINED WITH A PRECISION OF 1600DPI | IMAGE FORMING POSITION OF COMPUTER-FORMED IMAGE |

BARYCENTER OF OVERLAPPED
IMAGE FORMING POSITION

RIGHT EDGE POSITION
OF THE OVERLAPPED IMAGE
FORMING POSITION

WIDTH OF THE OVERLAPPED
IMAGE FORMING POSITION

RIGHT EDGE POSITION OF
THE OVERLAPPED IMAGE
FORMING POSITION

LOWER EDGE POSITION OF
THE OVERLAPPED IMAGE
FORMING POSITION

← BOUNDARY POSITION OF THE OVERLAPPED IMAGE FORMING POSITION (IN THE CASE OF LOWER RIGHT EDGE, 60 DEGREES)

| GROUP NUMBER | AC COEFFICIENT | ADDITIONAL BIT NUMBER |
|---|---|---|
| 1 | -1, 1 | 1 |
| 2 | -3, -2, 2, 3 | 2 |
| 3 | -7~-4, 7~4 | 3 |
| 4 | -15~-8, 8~15 | 4 |
| 5 | -31~-16, 16~31 | 5 |
| 6 | -63~-32, 32~63 | 6 |
| 7 | -127~-64, 64~127 | 7 |
| 8 | -255~-128, 128~255 | 8 |
| 9 | -511~-256, 256~511 | 9 |
| 10 | -1023~-512, 512~1023 | 10 |

| GROUP NUMBER | DC COEFFICIENT | ADDITIONAL BIT NUMBER |
|---|---|---|
| 1 | -1, 1 | 1 |
| 2 | -3, -2, 2, 3 | 2 |
| 3 | -7~-4, 7~4 | 3 |
| 4 | -15~-8, 8~15 | 4 |
| 5 | -31~-16, 16~31 | 5 |
| 6 | -63~-32, 32~63 | 6 |
| 7 | -127~-64, 64~127 | 7 |
| 8 | -255~-128, 128~255 | 8 |
| 9 | -511~-256, 256~511 | 9 |
| 10 | -1023~-512, 512~1023 | 10 |
| 11 | -2047~-1024, 1024~2047 | 11 |

FIG.27A

RASTER IMAGE

FIG.27B

SELECTIVE INFORMATION

FIG.27C

VECTOR IMAGE

TONE COMPRESSING PROCESSING

TONE EXPANDING PROCESSING

FIG.31A

| 64 | 53 | 42 | 26 | 27 | 43 | 54 | 61 |
|----|----|----|----|----|----|----|----|
| 60 | 41 | 25 | 14 | 15 | 28 | 44 | 55 |
| 52 | 40 | 13 | 5  | 6  | 16 | 29 | 45 |
| 39 | 24 | 12 | 1  | 2  | 7  | 17 | 30 |
| 38 | 23 | 11 | 4  | 3  | 8  | 18 | 31 |
| 51 | 37 | 22 | 10 | 9  | 19 | 32 | 46 |
| 59 | 50 | 36 | 21 | 20 | 33 | 47 | 56 |
| 63 | 58 | 49 | 35 | 34 | 48 | 57 | 62 |

FIG.31B

| 64 | 53 | 42 | 26 | 27 | 43 | 54 | 61 |
|----|----|----|----|----|----|----|----|
| 60 | 41 | 25 | 14 | 15 | 28 | 44 | 55 |
| 52 | 40 | 13 | 5  | 6  | 16 | 29 | 45 |
| 39 | 24 | 12 | 1  | 2  | 7  | 17 | 30 |
| 38 | 23 | 11 | 4  | 3  | 8  | 18 | 31 |
| 51 | 37 | 22 | 10 | 9  | 19 | 32 | 46 |
| 59 | 50 | 36 | 21 | 20 | 33 | 47 | 56 |
| 63 | 58 | 49 | 35 | 34 | 48 | 57 | 62 |

FIG.32

| PIXEL CORRESPONDING TO RESOLUTION REQUIRED FOR CHARACTER GRAPHIC IMAGE | PIXEL CORRESPONDING TO RESOLUTION REQUIRED FOR NATURAL IMAGE |
|---|---|
| 1/24mm × 1/24mm (3×3 grid) | 1/8mm × 1/8mm |

IMAGE ENCODING APPARATUS

BACKGROUND OF THE INVENTION

1. Field of the Invention

The present invention relates to an image encoding apparatus suitable for adapting to an image forming apparatus using an areal tone method.

2. Description of the Prior Arts

There are following two types in image data performed by a printer.

(1) Raster image information inputted as bit map information. The raster image is generally gray-scale image.
(2) Vector information inputted as an graphic drawing command or text data and converted to raster information by being subjected to graphic drawing and rasterizing at printing. The vector information can generally be represented as an area where uniform pixel value is continuous.

The resolution of the raster information and that of the vector information (a size for one pixel at marking) are not always the same. The raster information showing a natural image is generally sufficient to have a relatively low resolution, with the result that it is expressed with low resolution. Further, the vector information showing a character or graphic image has an importance on positional information, so that it is expressed with high resolution.

For example, character-graphic image information that is vector information is frequently expressed by a binary with high resolution and half-tone image that is a raster image is frequently expressed with low resolution like a method (Conventional Example 1) disclosed in Japanese Unexamined Patent Application No. Hei 8-223423.

In Conventional Example 1, the raster image is gray-scale data of 300 dpi (dot per inch: 1 inch is approximately 25.4 mm) resolution and the vector image is binary data with 600 dpi resolution. At this time, an area for one pixel of the raster image corresponds to an area for four pixels that are the total of two pixels in the longitudinal direction and two pixels in the widthwise direction of the vector image. An example in which the raster image and vector image are present is shown in FIG. 28. In FIG. 28, a single rectangular corresponds to one pixel, a shaded area is a raster image area and the other area is a vector image area.

There are sixteen kinds of a pattern of data for four pixels of the vector image corresponding to one pixel of the raster image as shown in FIG. 29. In Conventional Example 1, the image is a raster image until the level of the pixel value of 0 to 239 in order to express the raster image and vector image on the same plane. Additionally, the image is a vector image until the level of 240 to 255. The data pattern of sixteen kinds shown in FIG. 29 is allotted with respect to the pixel value level of 240 to 255. Since the raster image becomes 240 level, a tone compressing processing shown in FIG. 30A is performed in case where an image of 256 tones is inputted. A tone expanding processing shown in FIG. 30B is performed when an image of 256 tones is outputted.

A higher tone number or resolution is required for printing a digital image with high quality. A capacity of an image is represented by (pixel number×tone bit number), thereby being enormous. It is desired to make as small as possible the amount of an image transmitted to a printer or the amount of an image processed in the printer in order to reduce an accumulating cost of an image or transmitting cost.

Various image encoding methods have been proposed as a method for reducing the amount of image data. A typical image encoding method among these methods is JPEG Baseline method (Conventional Example 2). JPEG Baseline method is disclosed in "International Standard of Multimedia Encoding", edited by Dr. Yasuda, Maruzen, p. 18 to p. 23 (JPEG: Joint Photographic coding Experts Group). This method is explained hereinafter with regard to FIG. 22.

In FIG. 22, designated at 1001 is an input image, 1002 a block circuit, 1003 a DCT circuit, 1004 a quantizer, 1005 a quantizing table, 1006 a scan converting circuit, 1007 a significant coefficient detecting circuit, 1008 a grouping circuit, 1009 a ran length counter, 1010 a two-dimensional Huffman encoding circuit, 1011 a DC difference calculating circuit, 1012 a grouping circuit, 1013 an one-dimensional Huffman encoding circuit, 1014 a duplexing circuit and 1015 is an output code.

In FIG. 22, the inputted image 1001 is divided into blocks of 8×8 pixels (hereinafter referred to as pixel block) at the block circuit 1002. The pixel block is DCT-transformed at the DCT circuit 1003, whereby a transformed coefficient outputted as a result of the DCT is quantized at the quantizer 1004 in accordance with the quantizing step information memorized at the quantizing table 1005. The quantized converting coefficient can be represented by a matrix of 8×8. The converting coefficient is generally positioned such that the coefficient in the longitudinal direction of the matrix corresponds downwardly to a higher DCT coefficient and the coefficient in the widthwise direction corresponds rightwardly to a higher DCT coefficient. The most leftward and uppermost coefficient among sixty-four converting coefficients is the one corresponding to a direct current frequency area of a DCT transforming area, so that it is called as a direct current component or DC coefficient. The other sixty-three coefficients correspond to an alternating current frequency area, so that it is called as an alternating current component or AC coefficient.

The difference from the DC component of the previous image block is taken out from the DC coefficient at the DC difference calculating circuit 1011, and then the resultant DC coefficient is sent to the grouping circuit 1012.

At the grouping circuit 1012, group numbers and additional bits shown in FIG. 25 are calculated from the DC difference. The additional bit is a value for specifying the DC difference in the same group. The bit numbers of the additional bit are shown in FIG. 25.

The group numbers calculated at the grouping circuit 1012 is Huffman-encoded at the one-dimensional Huffman encoding circuit 1013. Further, the additional bit is sent to the duplexing circuit 1014.

The AC coefficient quantized at the quantizer 1004 is scan-converted to a zigzag scan order shown in FIG. 23 at the scan converting circuit 1006, and then, sent to the significant coefficient detecting circuit 1007. The significant coefficient detecting circuit 1007 determines whether the quantized AC coefficient is "0" or except for "0". If "0", a count up signal is supplied to the run length counter 1009 for increasing the counter value by one. If the value of the AC coefficient is a significant coefficient except for "0", a reset signal is supplied to the run length counter 1009 for resetting the counter value as well as the AC coefficient is sent to the grouping circuit 1008.

The run length counter 1009 is a circuit for counting the run length of "0". NNNN that is a number of "0" between the significant coefficients is sent to the two-dimensional Huffman encoding circuit 1010. At the grouping circuit 1008, the AC coefficient is divided into group numbers SSSS and additional bits shown in FIG. 24. Then, the group numbers are sent to the two-dimensional Huffman encoding circuit 1010 and the additional bits are sent to the duplexing circuit 1014. The additional bit is a value for specifying the DC difference in the same group. The bit numbers of the additional bit are shown in FIG. 24.

The two-dimensional encoding circuit 1010 performs Huffman encoding to the combination of the run length NNNN and the group number SSSS, and send it to the duplexing circuit 1014.

The duplexing circuit 1014 duplexes the DC coefficient Huffman code, AC coefficient Huffman code, DC coefficient additional bit and AC coefficient additional bit for one pixel block, and then, outputs code data 1015.

As described above, JPEG Baseline encoding method is a lossy encoding method intended for the gray-scale image. Further, the JPEG Baseline encoding method decreases electricity in a high frequency range, in other words, reduces a redundancy expecting characteristics that the neighboring pixel values are liable to be the same values. Accordingly, it is suitable for an ordinal natural image in which a high frequency is reduced. Further, there arises a problem that an encoded distortion occurs or code amount increases for an image in which power in the high frequency range is greatly contrary to the expectation.

The JPEG Baseline encoding method that is a gray-scale image encoding method is advantageous to a natural image in which an power at the high frequency area is small.

Subsequently illustrated as a second example of the image encoding is an example of an MH encoding method disclosed in "Digital Signal Processing of Image" (Nikkan Kogyo Shimbunsha) at 257 pages to 261 pages.

In the MH encoding method, an inputted binary image is scanned in the order of a raster scan shown in FIG. 26. A continuous number (run length) of a black pixel or white pixel is measured in the raster scan order, whereby the run length is Huffman-encoded. A short code is allotted to a run length having a high appearance probability, while a long code is allotted to a run length having a low appearance probability, with the result that efficient encoding is possible.

As described above, the MH encoding method is a lossless encoding method intended for a binary image. The MH encoding method is suitable for a text or graphic image.

The vector image can be represented as an area where a uniform pixel value is continuous. Generally, a data amount of such an image can be reduced by a binary lossless encoding method. The binary lossless encoding method of the MH encoding can be adapted by setting a state that a paint area of the vector image is black (pixel value of 1) and non-paint area is white (pixel value of 0).

When only a raster image or only a vector image is present in a print image, either one of the encoding methods may be utilized. The case where both images are present in the print image becomes a problem.

In the case of inserting in the level of the pixel value like the Conventional Example 1, encoding can be performed by using a gray-scale encoding method such as JPEG Baseline method.

Another method is the one using three plane configuration shown in FIG. 27 (Conventional Example 3).

In the Conventional Example 3, the raster image and vector image are possessed in another plane, and further, a selective information plane of 1-bit per pixel for selecting the raster image and vector image is added, whereby one printing image can be produced. In this method, encoding may be executed such that the raster image is encoded by the gray-scale image encoding method and the vector image and the selective information are encoded by the binary image encoding method.

Moreover, described hereinbelow is the example (Conventional Example 4) in which both images are present in a printing image due to the representation of the tone by the areal tone method.

In the case where a density cannot be changed by a technique for changing a thickness of ink or toner for every each dot in various printing methods, a technique for representing a tone by changing an area in which ink or toner exists is used.

For example, there is an areal tone method by a dither shown in "Imaging Part 1", published by SHASHIN KOGYO SHUPPAN-SHA, pp. 118. The areal tone method explained here converts an inputted gray-scale pixel of one pixel into a binary pixel block of 8×8=64 pixels. The inputted pixel value is rendered to be N. Binarization is performed by comparing N with a numerical value of a matrix shown in FIG. 31A. If the value N is greater than the numerical value of each matrix, its pixel becomes ON (a pixel to which ink or toner is adhered). If the value N is smaller than or same as the numerical value of each matrix, its pixel becomes OFF (a pixel to which toner or ink is not adhered).

In the case of the inputted pixel value of 25, for example, a shape shown in FIG. 31B is obtained for representing a tone.

According to the above, the raster image that is a gray-scale image can be represented by the binary image. When the resolution of the vector image becomes the same as the resolution of the dither matrix, the raster image and vector image can be accumulated and encoded by the same system (i.e., accumulated as the binary image and encoded by the binary image encoding method).

The conventional examples explained above still have the following problems.

(1) In case where a resolution of an image inputted with a bit map is higher than a resolution upon printing in a conventional method, a band area is controlled to lower the resolution of the inputted image to the resolution upon printing to thereby perform an encoding for a raster image. However, there is a case that an image is a vector image such as a character graphic image even if the image is inputted with a bit map. Positional information is important for the character graphic image, so that the image quality is deteriorated when the resolution is simply lowered. It is necessary to possess a raster image with a resolution required for the character graphic image in order not to deteriorate the image quality.

For example, assuming that a resolution required for the character graphic image is 24 dot/mm and a resolution required for the natural image is 8 dot/mm. It may be sufficient that one pixel is present in a square of ⅛ mm in length and breadth with respect to the natural image. However, nine pixels (3×3) are required in the square of ⅛ mm in length and breadth in order not to deteriorate the image quality in the case where character graphic image information is present in the image inputted in the form of a bit map. Specifically, as shown in FIG. 32, data for nine pixels is always necessary at the area where one pixel is sufficient when the character graphic information is not present. When the resolution required for the character graphic image becomes higher, an amount of required data further increases.

(2) There are following problems in each conventional example with respect to image data format in the case where both of the gray-scale image information and binary image information are present.

(1) The binary image pattern is converted into a pixel value level in the Conventional Example 1, so that there is a risk that an image does not become the one assumed in the lossy encoding method such as JPEG Baseline method. Specifically, there is no assurance that the pixel level of the adjacent pixel is liable to be similar. In this case, a compression rate of the JPEG Baseline method does not increase.

Further, compression and expansion are performed with the pixel level as it is in the Conventional Example 1, thereby deteriorating the image quality.

(2) There are plural planes in the Conventional Example 3, thereby being complicated. Moreover, two planes exist at the same position as well as the selective information is originally unnecessary information, whereby the pixel amount becomes triple of the minimum necessary amount.

(3) A single process is possible as the binary information as a whole in the Conventional Example 4. However, when the pixel value information, if it is a gray-scale, that could originally be represented by 8-bit is converted into binary dither dot information, 64-bit is required in the example shown in FIGS. 31A and 31B. Moreover, an effective lossy encoding method does not exist in the case of the binary image, whereby the compressing rate cannot be increased to thereby entail a large amount of data.

SUMMARY OF THE INVENTION

The present invention has been made in view of the above circumstances and provides an image encoding apparatus that is effective since it is unnecessary to possess information of a resolution beyond necessity by separating image information utilizing for an apparatus for forming an image by an areal tone method into density information of a minimum resolution that is visually significant and positional information where toner or ink is marked, and further provides an image encoding apparatus capable of integrally dealing with gray-scale image information and binary image information.

The present invention realizes an image encoding apparatus that is effective and that does not generate visual distortion by utilizing the following two points with regard to visual characteristics.

(1) Frequency characteristics of vision reduces as the frequency becomes high. This means that a stripe pattern beyond a predetermined frequency cannot visually be detected as a stripe but is visible such that a density value is uniform. FIG. 2 shows this state.

(2) A shift of a phase has sensitivity more than the above-mentioned frequency. This means that a shift amount is detectable even if a period interval is the same as or below the detecting limit. As shown in FIG. 3, although an upper and a lower stripe patterns are hard to see, a boundary line that is shifted by the same interval as the stripe pattern (i.e., a phase is shifted by 180 degrees) is clearly seen.

This is because a visual model is shown as the following.

The visual model will be explained with reference to FIG. 21. Light is irradiated to a printing image. A component saved from the absorption from ink or toner becomes an incident light to an eye. Image information can generally be represented by a noncyclic process with two aspects of an image position and frequency characteristics as variables. The incident light to an eye is represented by $F(\omega, t)$ by using an image position t and angular frequency $\omega$. As shown in FIG. 21, it is considered that two processes, i.e., an image position differential $\partial/\partial t$ and a frequency transfer function $H(\omega)$ with respect to the incident light information. The frequency transfer function $H(\omega)$ is a function that reduces as the frequency becomes high. The formula $\partial/\partial t$ is a process for extracting an edge by differentiating the image information with poisitonal information. The results of the processing, i.e., $\partial F(\omega, t)/\partial t$ and $H(\omega) F(\omega, t)$ are overlapped by some format to finally be a perception. It is considered that human's vision simultaneously performs two processes, namely a process to see by uniformly integrating a pixel value and a process to see by extracting a boundary of an object. Therefore, it is considered that an ability to feel a half-tone in an areal tone such as a dither is due to the former processing and that an ability to recognize a shape of an object is due to the latter process.

In view of the above consideration, the present invention provides an image encoding apparatus capable of integrally representing an image with a minimum necessary data amount by representing all pixels with a lowest resolution of a detecting limit and by separately affording information of a phase shift that cannot be represented with the lowest resolution.

The information of the lowest resolution is a pixel value itself, so that it is given as gray-scale information.

Further, all of them are finally binarized and marked in the areal tone. The binary image can be represented by a position of an ON image, i.e., a position of a marked ink or toner. This position corresponds to the phase shift.

According to an aspect of the present invention, an image encoding apparatus has a part that generates, based upon image information, areal data representing an area of a mark outputted to an inside of a pixel having a size corresponding to a screen resolution, and a part that generates positional data representing the position of the mark inside the pixel. The image information is represented by the areal data and the positional data.

The screen resolution means a limit resolution by which the stripe pattern is not detected but the density value is averaged. The position of the mark means the amount of the phase shift.

A conceptional explanation of this method is performed with reference to FIG. 4. In FIG. 4, it is assumed that a precision of the phase information double of the screen resolution is required. Further, it is assumed that the pixel value level is 0 to 255.

The raster image that is an ordinal natural image can be represented with a minimum resolution, whereby the position to which ink or toner is marked may be everywhere. Specifically, it is sufficient that a suitable areal tone is performed. As shown in FIG. 4A, it can be represented only by a pixel value. Similarly, the pixel value 0(b) and pixel value 255(f) are also represented only by a pixel value. In the case of an image requiring a phase information such as a character graphic image or the like, it is encoded like FIGS. 4C, 4D and 4E. For example, the pixel value is 64 in FIG. 4C due to the occupation of ¼ of the total area. The positional information of lower right is critical. When the positional information of "lower right" is added to the pixel value, the information of the pixel value of FIG. 4C can be maintained without distortion. It becomes possible to encode the character graphic image information without distortion by adding the positional information of lower right. As for FIG. 4D, the character graphic image information can be encoded without distortion by giving positional information of "lower" to the pixel value of "128". As for E, the character graphic image information can be encoded without distortion by giving positional information of "other than upper left" to the pixel value of "192".

According to another aspect of the present invention, the image encoding apparatus has a first input unit that inputs a gray-scale bit map image, a second input unit that inputs a computer-formed image, a unit that obtains, based upon the gray-scale bit map image, an area of a first mark in a pixel having a size corresponding to a screen resolution, a unit that obtains an area of a second mark in the pixel based upon the computer formed image, a composing unit that obtains an area of a third mark by overlapping the area of the first mark and the area of the second mark, a unit that generates areal data representing an area of the third mark, and a unit that generates positional data representing a position of the third mark. The image information is represented by the areal data and the positional data.

The gray-scale bit map information is the raster image described in the conventional example. The computer formed image means the vector image described in the conventional example. The position of the mark (image formation) shows the position where ink or toner is adhered in a printing apparatus of the areal tone method. The position where the mark is formed is a composition of the position where the raster image is formed and the position where the vector image is formed, whereby the image encoding apparatus according to another aspect of the present invention has a composing unit.

According to another aspect of the present invention, the image encoding apparatus has a unit that inputs a gray-scale bit map image, a unit that generates, based upon the gray-scale bit map image, areal data representing an area of a mark in a pixel having a size corresponding to a screen resolution, and a unit that generates, based upon the gray-scale bit map image, positional data representing a position of the mark in the pixel. The image information is represented by the areal data and the positional data.

The image encoding apparatus according to another aspect of the present invention is suitable only for the case where the input image is the gray-scale bit map.

According to another aspect of the present invention, the image encoding apparatus has a unit that inputs a computer-formed image, a unit that generates, based upon the computer formed image, areal data representing an area of a mark in a pixel having a size corresponding to a screen resolution, and a unit that generates, based upon the computer formed image, positional data representing a position of the mark in the pixel. The image information is represented by the areal data and the positional data.

The image encoding apparatus according to another aspect of the present invention is suitable only for the case where the input image is the computer-formed image.

BRIEF DESCRIPTION OF THE DRAWINGS

Preferred embodiments of the present invention will be described in detail based on the followings, wherein:

FIG. 7 is a view for explaining a one-dimensional areal tone;

FIG. 12 is a view for explaining a two-dimensional areal tone;

FIGS. 27A–C are views for explaining a three-plane configuration of the Conventional Example 3:

FIGS. 31A and 31B are views for explaining a generation of a dither of a Conventional Example 4; and FIG. 32 is a view for explaining a problem to be resolved by the invention.

PREFERRED EMBODIMENT OF THE INVENTION

Embodiments of the present invention will be explained hereinafter.

Embodiment 1

The Embodiment 1 shows an example in which a raster image and vector image are inputted and image forming position information is a barycenter of an image forming area.

A gray-scale bit map image has the same meaning as the above-mentioned raster image hereinafter. Further, a computer formed image is used to have the same meaning as the vector image.

Figures 1, 2:
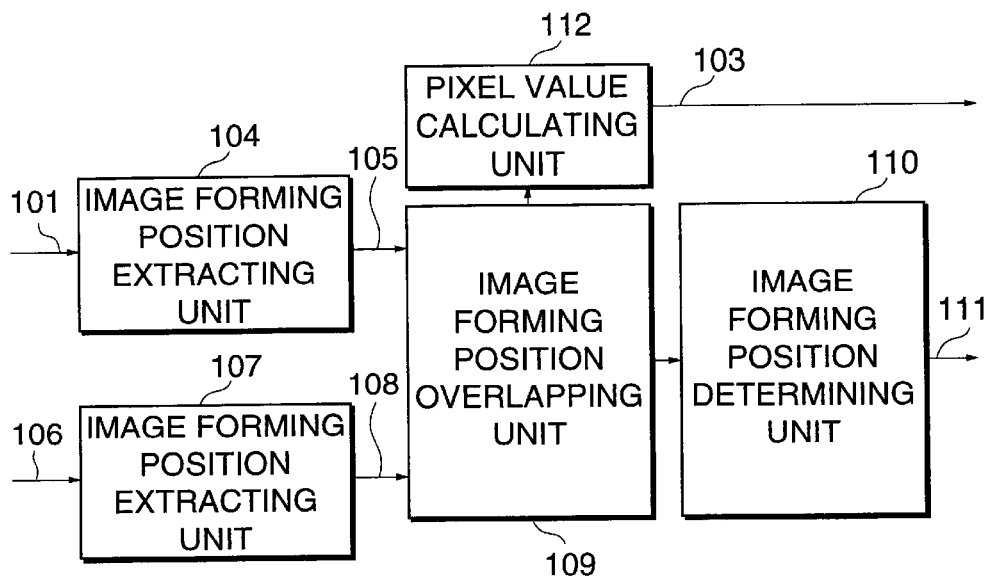
FIG. 1 is a view for explaining a configuration (Embodiment 1) of the present invention.
FIG. 2 is a view for explaining a visual limit, especially visual characteristics.
Figures 3, 4:
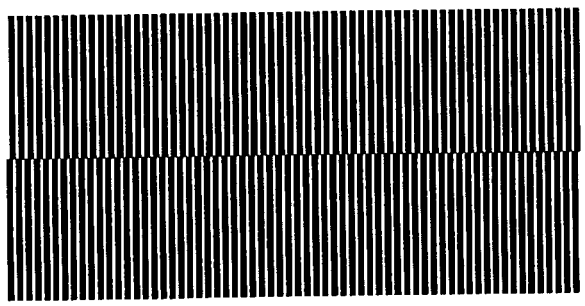
FIG. 3 is a view for explaining visual characteristics, especially visual characteristics with regard to a shift of a phase.
FIG. 4 is a view for explaining a principle of the present invention.

This embodiment will be explained hereinafter with reference to FIG. 1. In FIG. 1, designated at 101 is an inputted gray-scale bit map image, 103 a pixel value of a final resolution, 104 a image forming position extracting unit of the gray-scale bit map image, 105 image forming position information of the extracted gray-scale bit map image, 106 an inputted computer formed image, 107 an image forming position extracting unit of the computer formed image, 108 an image forming position of the extracted computer formed image, 109 an image forming position overlapping unit 110 a final image forming position determining unit, 111 final image forming position phase information, and 112 a pixel value calculating unit for calculating a final pixel value.

An operation will be described hereinafter in detail. In the following example, a screen resolution is 200 dpi (200 dot/25.4 mm). Moreover, a detecting limit of a shift amount of a phase is 1600 dpi as a result of conversion by using the resolution.

Moreover, an image is formed by an one-dimensional areal tone method shown in FIG. 7 in this embodiment. As shown in FIG. 7, one pixel has a rectangular shape. An area (mark) to which ink or toner is adhered increases one-dimensionally in a rectangular of one pixel, thereby realizing a tone. When the area to which ink or toner is adhered is large, a density value becomes high, while the density value becomes low when the area to which ink or toner is adhered is small.

The input gray-scale bit map information 101 is inputted with a resolution higher than the screen resolution in order to maintain edge information. For example, it is inputted with 400 dpi in a fast-scanning direction.

The input gray-scale bit map information 101 is inputted to the image forming position extracting unit 104, whereby the image forming position information 105 of the gray-scale bit map information is extracted.

Figures 8, 9:
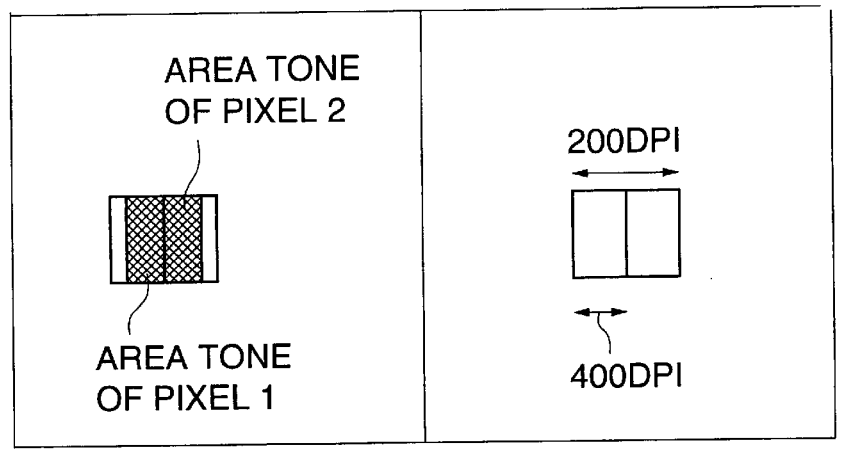
FIG. 8 is a view for explaining a one-dimensional areal tone obtained as a half resolution from two pixel data.
FIG. 9 is a view for explaining a one-dimensional areal tone of gray-scale bit map information and computer formed image.

The image forming position extracting unit 104 extracts one image forming position from the inputted gray-scale bit map information 101 of two pixels since there is a difference between the input resolution and screen resolution. As shown in FIG. 8, one pixel of 200 dpi is divided from the center and two input gray-scale bit map information of 400 dpi, i.e., the leftward bit map information of 400 dpi and the rightward bit map information of 400 dpi are subjected to the areal tone, with the result that one image forming position can be extracted. At this time, the position for forming an image is necessarily rendered to be in contact with the center of one pixel of 200 dpi.

Moreover, the inputted computer formed image 106 is inputted to the image forming position extracting unit 107. The image forming position of the computer formed image 106 is generated with a precision of 1600 dpi at the image forming position extracting unit 107.

Two image forming positions thus produced are illustrated in FIG. 9

Figure 10:
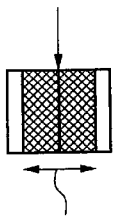
FIG. 10 is a view for explaining a logical sum of a one-dimensional areal tone.

The image forming position overlapping unit 109 calculates a logical sum of the image forming position shown in FIG. 9. The logical sum is calculated such that the position where the image is formed is 1 and the position where the image is not formed is 0. An example of a pixel from which the logical sum is calculated is illustrated in FIG. 10. The image producing position overlapped by the image forming position overlapping unit 109 is sent to the pixel value calculating unit 112 and the image forming position determining unit 110.

In the case where a space occurs between two image forming positions at the image forming position overlapping unit 109, the image forming position of the gray-scale bit map information is moved to erase the space.

At the pixel value calculating unit 112, a width of the overlapped image forming position is measured and the measured value is converted to the pixel value. FIG. 10 shows the width of the overlapped image forming position.

The maximum width of the image forming position is represented by W, the width of the overlapped image forming position is represented by X and the level number of the pixel value finally required is represented by L. The pixel value Y obtained at the pixel value calculating unit 112 can be obtained by the following calculation:

$$Y = L \times X / W$$ Numerical Formula 1

The pixel value can be represented by 8-bit, for example.

A barycenter of the overlapped image forming position is calculated at the image forming position determining unit 110. Since the precision of the phase shift is determined to be 1600 dpi, the precision of the location of the barycenter may be 1600 dpi. The image forming position can be represented by 3-bit since the precision is for equally dividing one pixel of 200 dpi into eight.

Figure 11:
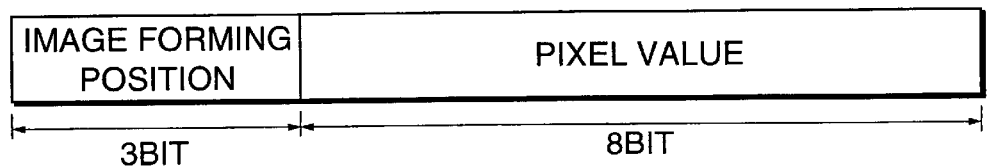
FIG. 11 is a view for explaining an example of an image format.

As understood from the above, the required amount of the information for expressing the image information of an area corresponding to one pixel of 200 dpi is 8-bit pixel value plus 3-bit barycenter, i.e., 11-bit in total in the present invention. As shown in FIG. 11, information of 11-bit is given every one pixel of 200 dpi, to thereby be capable of forming an image having no distortion in image quality.

The Conventional Examples 2 and 3 can possess information without deteriorating image quality. Comparing the Conventional Examples 2 and 3, the Conventional Example 2 has a smaller data amount. Therefore, a comparison is made with respect to the Conventional Example 2 about the data amount before compression.

In the Conventional Example 2, the resolution of 400 dpi cannot be decreased to 200 dpi with image quality assured. Therefore, information of at least 16-bit is required for expressing image information of an area corresponding to one pixel of 200 dpi. Moreover, as for the information of the computer formed image, an information amount of 8-bit is required with respect to one pixel of 200 dpi in the case where information amount of 1600 dpi is required, whereby information of 8-bit is required. Consequently, information of 24-bit in total is required.

This embodiment can reduce the information of 24-bit to 11-bit in view of visual characteristics.

Embodiment 2

This embodiment is described about the case where only the gray-scale bit map image is inputted.

The Embodiment 2 will be explained hereinafter with reference to FIG. 5.

Figure 5:
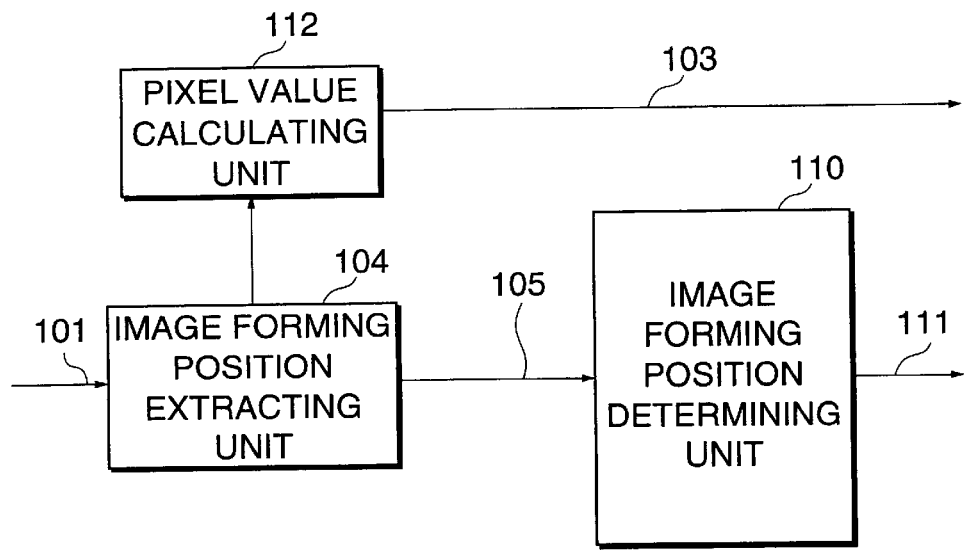
FIG. 5 is a view for explaining a configuration (Embodiment 2) of the present invention.

In FIG. 5, designated at 101 is the inputted gray-scale bit map image, 103 the pixel value of a final resolution, 104 the image forming position extracting unit of the gray-scale bit map image, 105 the image forming position information of the extracted gray-scale bit map image, 110 the final image forming position determining unit, 111 the final image forming position phase information, and 112 the pixel value calculating unit for calculating a final pixel value.

An operation will be described hereinafter in detail.

In the following example, a screen resolution is 200 dpi (200 dot/25.4 mm) like the Embodiment 1. Moreover, a detecting limit of a shift amount of a phase is 1600 dpi as a result of conversion by using the resolution.

Moreover, an image is formed by an one-dimensional areal tone method shown in FIG. 7. As shown in FIG. 7, one pixel has a rectangular shape. An area (mark) to which ink or toner is adhered increases one-dimensionally in a rectangular of one pixel, thereby realizing a tone. When the area to which ink or toner is adhered is large, a density value becomes high, while the density value becomes low when the area to which ink or toner is adhered is small.

The input gray-scale bit map information 101 is inputted with a resolution higher than the screen resolution in order to maintain edge information. For example, it is inputted with 400 dpi in a fast-scanning direction.

The input gray-scale bit map information 101 is inputted to the image forming position extracting unit 104, whereby the image forming position information 105 of the gray-scale bit map information is extracted.

The image forming position extracting unit 104 extracts one image forming position from the input gray-scale bit map information 101 of two pixels since there is a difference between the input resolution and screen resolution. As shown in FIG. 8, one pixel of 200 dpi is divided from the center and two input gray-scale bit map information of 400 dpi, i.e., the leftward bit map information of 400 dpi and the rightward bit map information of 400 dpi are subjected to the areal tone, with the result that one image forming position can be extracted. At this time, the position for forming an image is necessarily rendered to be in contact with the center of one pixel of 200 dpi.

At the pixel value calculating unit 112, a width of the image forming position 105 extracted at the image forming position extracting unit is measured and the measured value is converted to the pixel value. The operation of the pixel value calculating unit 112 is the same as the Embodiment 1.

The operation of the image forming position determining unit 110 is the same as the Embodiment 1. A barycenter of the overlapped image forming position is calculated. Since the precision of the phase shift is determined to be 1600 dpi, the precision of the location of the barycenter may be 1600 dpi. The image forming position can be represented by 3-bit since the precision is for equally dividing one pixel of 200 dpi into eight.

As understood from the above, the required amount of the information for expressing the image information of an area corresponding to one pixel of 200 dpi is 11-bit. As shown in FIG. 11, information of 11-bit is given for every one pixel of 200 dpi, to thereby be capable of forming an image having no distortion in image quality.

Embodiment 3

This embodiment is described about the case where only the computer formed image is inputted.

This embodiment will be explained hereinafter with reference to FIG. 6.

Figure 6:
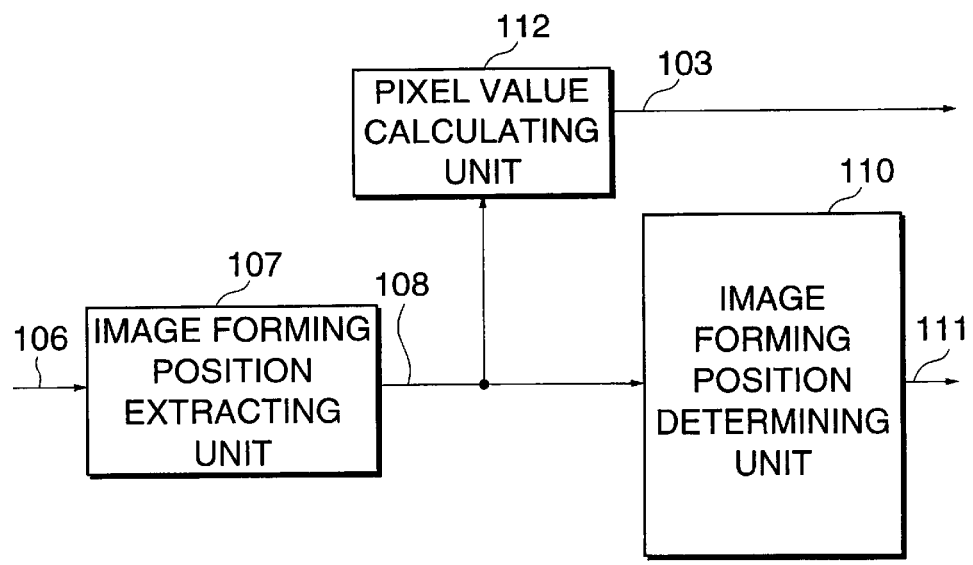
FIG. 6 is a view for explaining a configuration (Embodiment 3) of the present invention.

In FIG. 6, designated at 103 is the pixel value of a final resolution, 106 the inputted computer formed image, 107 the image forming position extracting unit of the computer formed image, 108 the image forming position of the extracted computer formed image, 110 the final image forming position determining unit, 111 the final image forming position phase information, and 112 the pixel value calculating unit for calculating a final pixel value.

An operation will be described hereinafter in detail.

In the following example, a screen resolution is 200 dpi (200 dot/25.4 mm) like the Embodiment 1. Moreover, a detecting limit of a shift amount of a phase is 1600 dpi as a result of a conversion by using the resolution.

Moreover, an image is formed by an one-dimensional areal tone method shown in FIG. 7. As shown in FIG. 7, one pixel has a rectangular shape. An area (mark) to which ink or toner is adhered increases one-dimensionally in a rectangular of one pixel, thereby realizing a tone. When the area to which ink or toner is adhered is large, a density value becomes high, while the density value becomes low when the area to which ink or toner is adhered is small.

The input computer formed image 106 is inputted to the image forming position extracting unit 107. The image forming position extracting unit 107 produces the image forming position of the input computer formed image 106 with a precision of 1600 dpi.

At the pixel value calculating unit 112, a width of the image forming position extracted at the image forming position extracting unit 107 is measured and the measured value is converted to the pixel value. The operation of the pixel value calculating unit 112 is the same as the Embodiment 1.

The image forming position determining unit 110 calculates a barycenter of the overlapped image forming position. Since the precision of the phase shift is determined to be 1600 dpi, the precision of the location of the barycenter may be 1600 dpi. The image forming position can be represented by 3-bit since the precision is the one for equally dividing one pixel of 200 dpi into eight.

As understood from the above, the required amount of the information for expressing the image information of an area corresponding to one pixel of 200 dpi is 11-bit. As shown in FIG. 11, information of 11-bit is given for every one pixel of 200 dpi, to thereby be capable of forming an image having no distortion in image quality.

The computer formed image is expressed by another plane or another resolution in the conventional example. However, the computer formed image can be expressed without distinguishing from the gray-scale bit map information, i.e., by the same system as the gray-scale bit map information in the present invention.

Embodiment 4

The aforesaid embodiments were described about the case of the one-dimensional areal tone for simplifying the explanation. The same configuration can be adapted for the case of a two-dimensional areal tone.

The operation will be explained hereinafter in detail.

In the following example, a screen resolution is 200 dpi (200 dot/25.4 mm). Moreover, a detecting limit of a shift amount of a phase is 1600 dpi as a result of conversion by using the resolution.

Moreover, an image is formed by an one-dimensional areal tone method shown in FIG. 12 in this embodiment. As shown in FIG. 12, one pixel has a rectangular shape. An area (mark) to which ink or toner is adhered increases two-dimensionally in a rectangular of one pixel, thereby realizing a tone. When the area to which ink or toner is adhered is large, a density value becomes high, while the density value becomes low when the area to which ink or toner is adhered is small. Similarly to the case of the one-dimensional areal tone, the image forming position of the areal tone is specified by a pixel value and a barycenter of the image forming position.

The input gray-scale bit map information 101 is inputted with a resolution higher than the screen resolution in order to maintain edge information. For example, it is inputted with 400 dpi in a fast-scanning direction.

The input gray-scale bit map information 101 is inputted to the image forming position extracting unit 104, whereby the image forming position information 105 of the gray-scale bit map information is extracted.

Figures 13, 14:
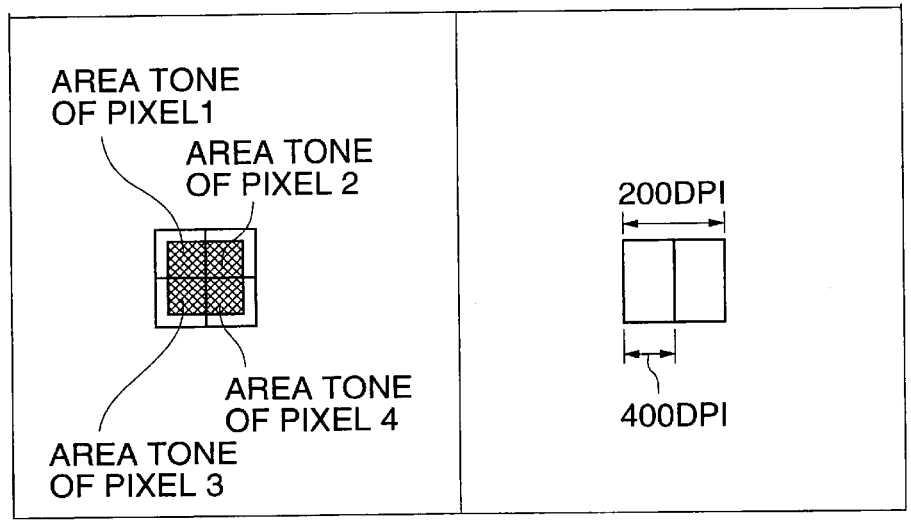
FIG. 13 is a view for explaining a two-dimensional areal tone obtained from four pixels.
FIG. 14 is a view for explaining a two-dimensional areal tone of gray-scale bit map information and computer formed image.

The image forming position extracting unit 104 extracts one image forming position from the input gray-scale bit map information 101 of four pixels (2×2) since there is a difference between the input resolution and screen resolution. As shown in FIG. 13, one pixel of 200 dpi is divided into four sections from the center and four input gray-scale bit map information of 400 dpi, i.e., the upward, downward, leftward and rightward bit map information of 400 dpi is subjected to the areal tone, with the result that one image forming position can be extracted. At this time, the position for forming an image is necessarily rendered to be in contact with the center of one pixel of 200 dpi.

Further, the input computer formed image 106 is inputted to the image forming position extracting unit 107. The image forming position extracting unit 107 produces the image forming position of the input computer formed image 106 with a precision of 1600 dpi.

Figure 15:
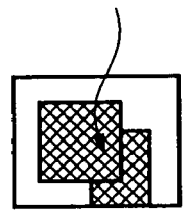
FIG. 15 is a view for explaining a logical sum of a two-dimensional areal tone.

Two image forming positions thus produced are illustrated in FIG. 14 The image forming position overlapping unit 109 calculates a logical sum of the image forming position shown in FIG. 14. The logical sum is calculated such that the position where the image is formed is 1 and the position where the image is not formed is 0. An example of a pixel from which the logical sum is calculated is illustrated in FIG. 15. The image producing position overlapped by the image forming position overlapping unit 109 is sent to the pixel value calculating unit 112 and the image forming position determining unit 110.

In the case where a space occurs between two image forming positions at the image forming position overlapping unit 109, the image forming position of the gray-scale bit map information is moved to erase the space.

At the pixel value calculating unit 112, an area of the overlapped image forming position is measured and the measured area is converted to the pixel value. FIG. 15 shows the width of the overlapped image forming position.

The maximum area of the image forming position is represented by W, the area of the overlapped image forming position is represented by X and the maximum level number of the pixel value finally required is represented by L. The pixel value Y obtained at the pixel value calculating unit 112 can be obtained by the following calculation:

$$Y = L \times X / W \qquad \text{Numerical Formula 1}$$

The pixel value can be represented by 8-bit, for example.

A barycenter of the overlapped image forming position is calculated at the image forming position determining unit 110. Since the precision of the phase shift is determined to be 1600 dpi, the precision of the location of the barycenter may be 1600 dpi. The image forming position can be represented by 3-bit in the one-dimensional areal tone since the precision is the one for equally dividing one pixel of 200 dpi into eight. The barycenter may be indicated independently in the fast-scanning direction and slow-scanning direction, whereby it can be represented by 6-bit in the two-dimensional areal tone.

Since the image forming position is represented only by a barycenter, the image forming position upon decoding does not have a complicated shape as shown in FIG. 15 but has a predetermined shape (for example, rectangle or dither screen shown in the Conventional Example 4). The complicated shape shown in FIG. 15 is visually meaningless information. The processing at the image forming position determining unit 110 can be said to be a process for reducing a visual redundancy.

Figure 16:
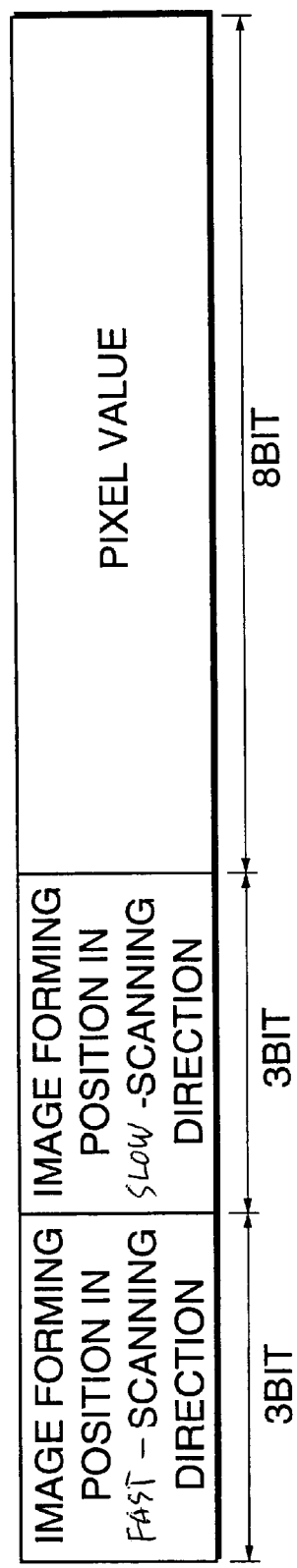
FIG. 16 is a view for explaining an example of an image format.

As understood from the above, the required amount of the information for expressing the image information of an area corresponding to one pixel of 200 dpi is eight plus six, i.e., 14-bit in total in the present invention. As shown in FIG. 16, information of 14-bit is given for every one pixel of 200 dpi, to thereby be capable of forming an image having no distortion in image quality.

The Conventional Examples 2 and 3 can possess information without deteriorating image quality. Comparing the Conventional Examples 2 and 3, the Conventional Example 2 has a smaller data amount. Therefore, a comparison is made with respect to Conventional Example 2 about the data amount before compression.

In the Conventional Example 2, the resolution of 400 dpi cannot be decreased to 200 dpi with image quality assured. Therefore, information of at least four pixels×8-bit=32-bit is required in the two-dimensional case for expressing image information of an area corresponding to one pixel of 200 dpi. Moreover, as for the information of the computer formed image, information amount of 8-bit is required with respect to one pixel of 200 dpi in the case where information amount of 1600 dpi is required, whereby information of 8-bit is required in the one-dimensional case. Therefore, information of 64 pixels=64-bit is required in the two-dimensional case. Consequently, information of 96-bit in total is required.

This embodiment can reduce the information of 96-bit to 14-bit in view of visual characteristics. A higher effect can be obtained than the one-dimensional case.

Although the example of the application with regard to the two-dimensional case as described above has been explained only to the Embodiment 1, it is apparent that the two-dimensional case can be adapted in the same manner to the Embodiments 2 and 3.

Embodiment 5

The image forming position information is represented by the barycenter in the Embodiment 1, while it is represented by the edge of the position where the image information is formed.

For example, an example in the one-dimensional case is shown. This embodiment is different from the Embodiment 1 only in the operation of the final image forming position determining unit 110. The operation of the final image forming position determining unit 110 alone will be explained hereinbelow.

Figure 17:
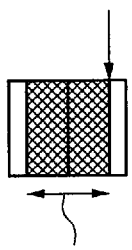
FIG. 17 is a view for explaining a logical sum of a one-dimensional areal tone.

A right edge position of the overlapped image forming position is calculated at the image forming position determining unit 110. Since the precision of the phase shift is determined to be 1600 dpi, the precision of the location of the right edge position may be 1600 dpi. The image forming position can be represented by 3-bit since the precision is the one for equally dividing one pixel of 200 dpi into eight. The right edge position of the overlapped image forming position is shown in FIG. 17. The image forming position shown in FIG. 17 is the same as that in FIG. 10.

Although the right edge position is shown in this embodiment, it is obvious that a left edge position may be utilized.

Embodiment 6

The image forming position information is represented by the barycenter in the Embodiment 4, while it is represented by the edge of the position where the image information is formed.

The one-dimensional image forming position is described in the Embodiment 1, while a two-dimensional example is shown in this embodiment.

This embodiment is different from the Embodiment 4 only in the operation of the final image forming position determining unit 110. The operation of the final image forming position determining unit 110 alone will be explained hereinbelow.

A right edge position and lower edge position of the overlapped image forming position are calculated at the image forming position determining unit 110. Since the precision of the phase shift is determined to be 1600 dpi, the precision of the location of the right edge position and lower edge position may be 1600 dpi. The image forming position can be represented by 3-bit since the precision is the one for equally dividing one pixel of 200 dpi into eight.

For example, a method for encoding the right edge position and lower edge position of the computer-formed image is considered in view of a concept that the image forming position of the computer formed image is important.

Figure 18:
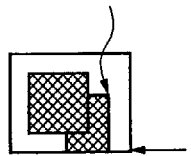
FIG. 18 is a view for explaining a logical sum of a two-dimensional areal tone.

The right edge position of the overlapped image forming position is shown in FIG. 18. The image forming position shown in FIG. 18 is the same as that in FIG. 15.

Although the right edge position and lower edge position are shown in this embodiment, it is obvious that a left edge position or upper edge position may be utilized.

Embodiment 7

The Embodiment 6 shows the case that the boundary of the image forming position is perpendicular or horizontal to the scanning line of the image, while this embodiment shows the case that the boundary of the image forming position is not parallel nor orthogonal to the scanning line of the image.

This embodiment is different from the Embodiment 4 only in the operation of the final image forming position determining unit 110. The operation of the final image forming position determining unit 110 alone will be explained hereinbelow.

A boundary position of the overlapped image forming position is calculated at the image forming position determining unit 110. Since the precision of the phase shift is determined to be 1600 dpi, the precision of the location of the right edge position and lower edge position may be 1600 dpi. Since the precision is for equally dividing one pixel of 200 dpi into eight, the image forming position can be represented by 4-bit because it is about 11.52 level by performing root 2 times in the case of the diagonal.

For example, a method for encoding the boundary position of the computer formed image is considered in view of a concept that the image forming position of the computer formed image is important. Further, an example for encoding only the most important boundary among the boundaries is shown here.

Figure 19:
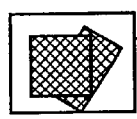
FIG. 19 is a view for explaining a logical sum of a two-dimensional areal tone.

The example of the boundary position of the overlapped image forming position is shown in FIG. 19. In the case of this figure, the lower right boundary position is encoded in view of the concept that the lower right boundary position is important. The angle of the boundary position is limited to the unit of 30 degrees. The boundary position and angle is related as follows with each other.

[Table 1]

0 degree: lower edge 30 degrees, 60 degrees: lower right edge 90 degrees; right edge 120 degrees, 150 degrees: upper right edge 180 degrees; upper edge 210 degrees, 240 degrees: upper left edge 270 degrees; left edge 300 degrees, 330 degrees: lower left edge By establishing the above relationship, the boundary position can be indicated by indicating the angle.

The boundary position can be represented by a positional precision of 4-bit and angle of 4-bit.

Embodiment 8

This embodiment, which is shown in FIGS. 1, 5 and 6, illustrates that final image forming position phase information 111 is lossless encoded and the pixel value of a final resolution 103 is lossy encoded.

Figure 20:
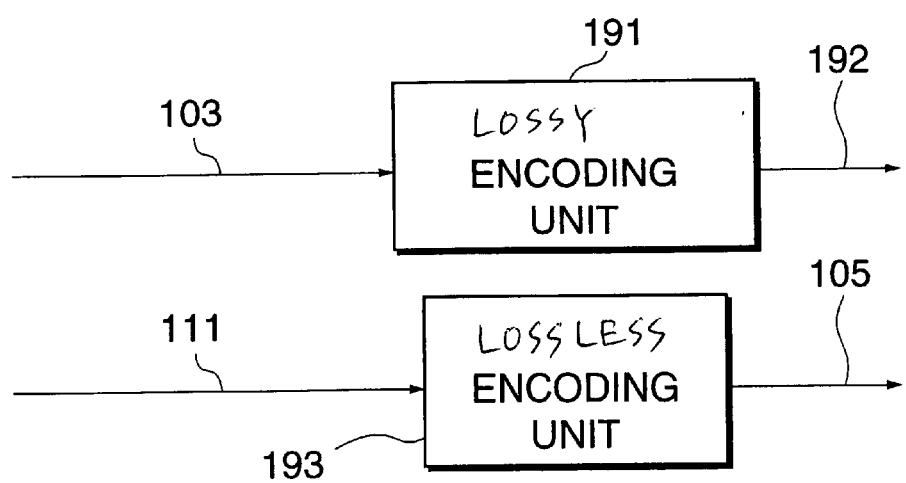
FIG. 20 is a view for explaining a configuration (Embodiment 8) of the present invention.
Figure 21:
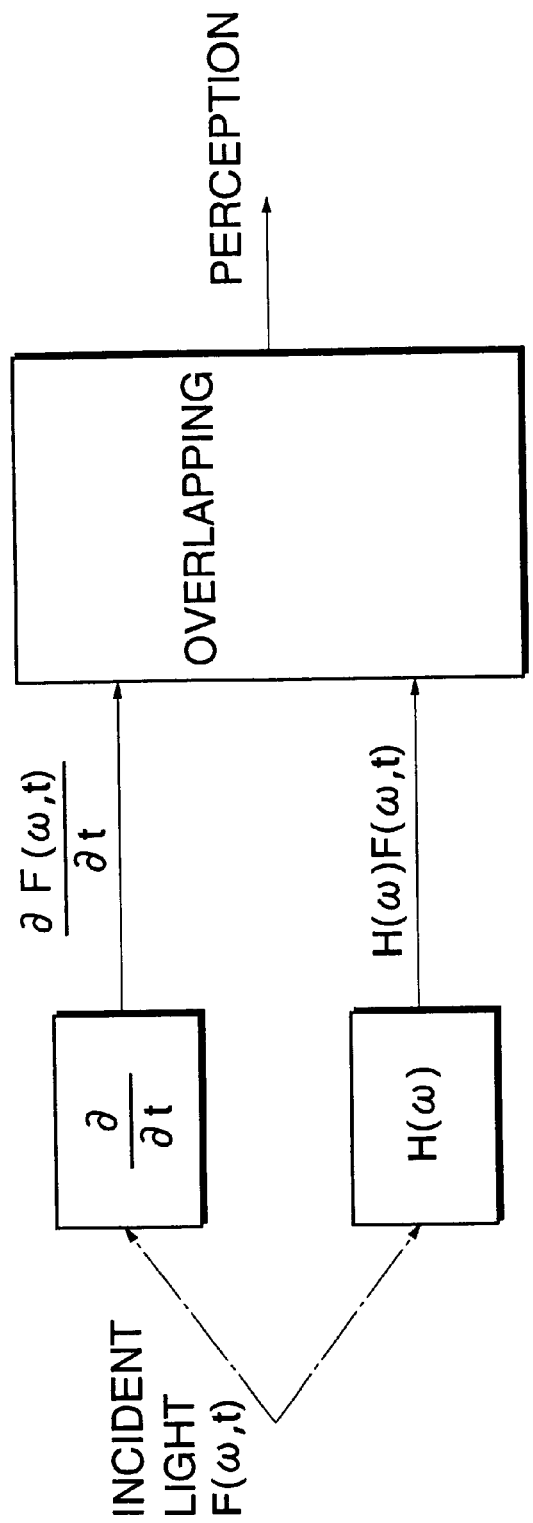
FIG. 21 is a view for explaining a visual model.
Figure 22:
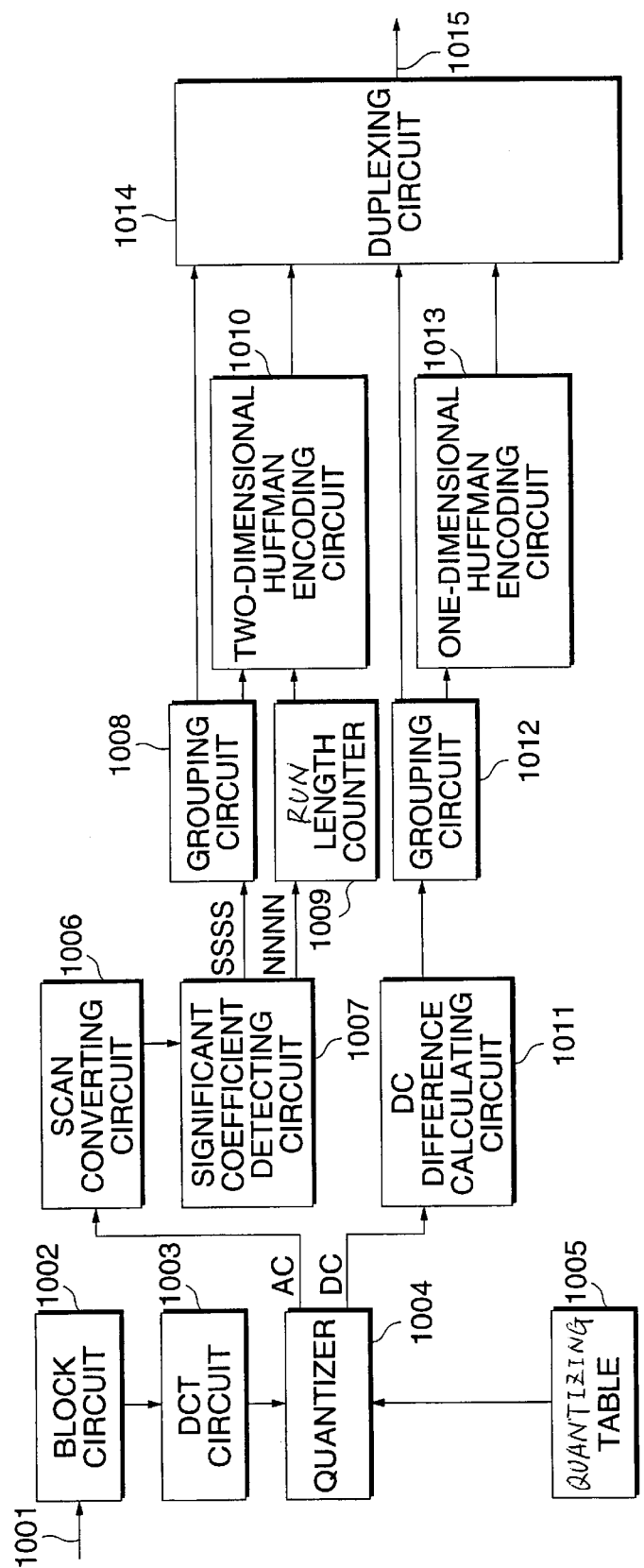
FIG. 22 is a view for explaining a lossy encoding method (JPEG Baseline method) of Conventional Example 2.
Figures 23, 24:
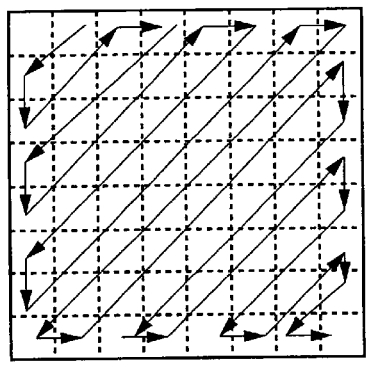
FIG. 23 is a view for explaining a scan conversion of the Conventional Example in FIG. 22.
FIG. 24 is a table showing a grouping AC coefficient of the Conventional Example in FIG. 22.
Figures 25, 26:
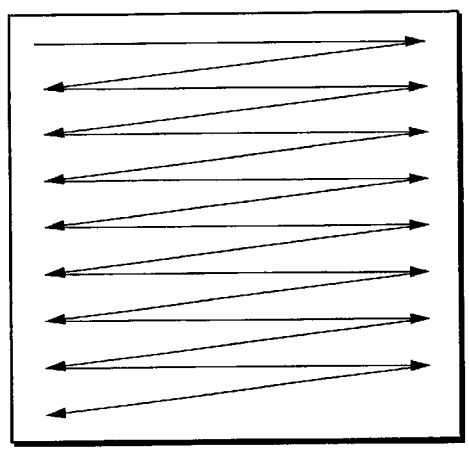
FIG. 25 is a table showing a grouped DC difference of the Conventional Example in FIG. 22.
FIG. 26 is a view for explaining a raster scan order of the Conventional Example in FIG. 22.
Figure 28:
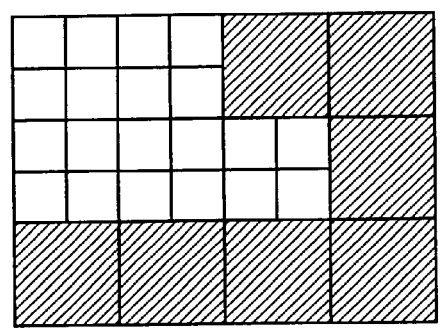
FIG. 28 is a view for explaining the Conventional Example 1.
Figure 29:
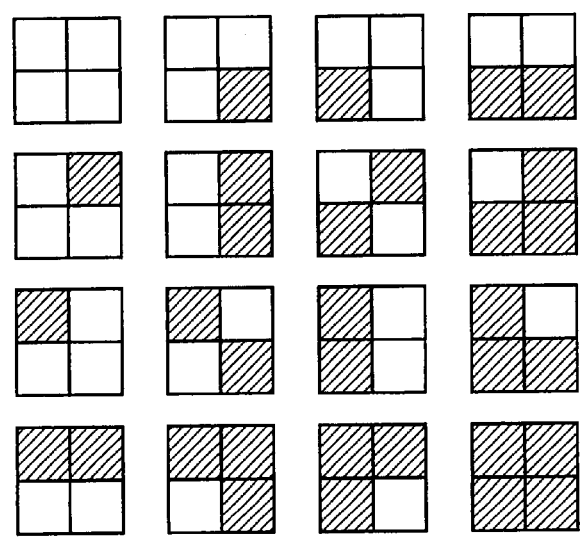
FIG. 29 is a view for explaining a binary data pattern of the Conventional Example 1.
Figure 30A:
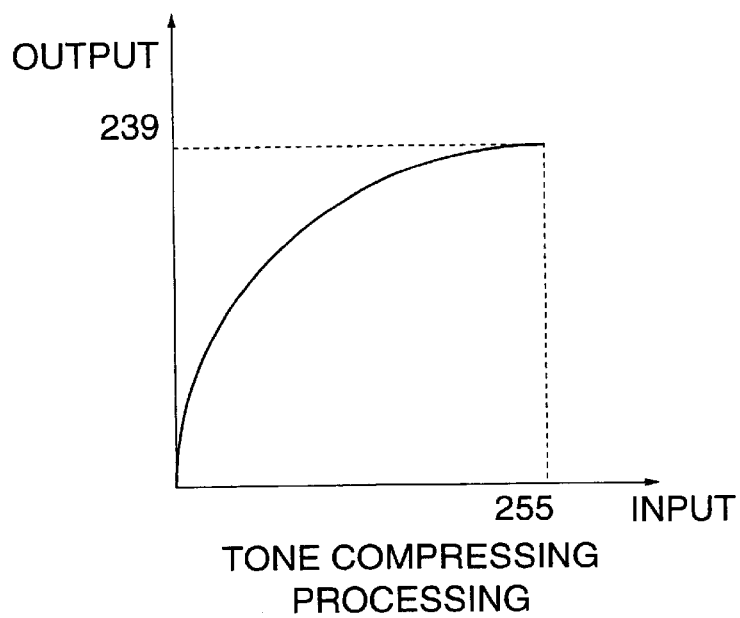
FIGS. 30A and 30B are views for explaining a tone compressing and expanding, respectively, of the Conventional Example 1.
Figure 30B:
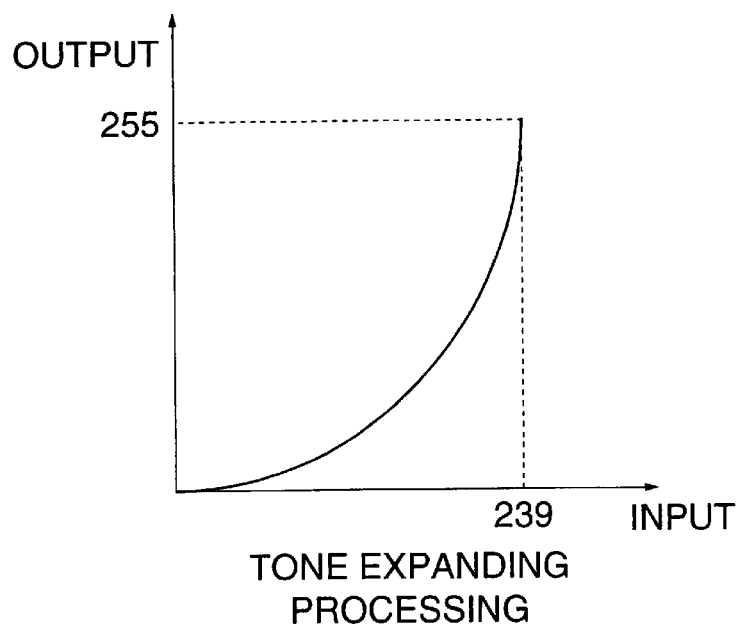

This embodiment will be explained with reference to FIG. 20 wherein designated at 103 is the pixel value of a final resolution, 111 the final image forming position phase information, 191 a lossy encoding unit, 192 a lossy code, 193 a lossless encoding unit, and 194 a lossless code.

The pixel value 103 of a final resolution is inputted to the lossy encoding unit 191 to be lossy encoded, to thereby be the lossy code 192. For example, the JPEG Baseline method described in the conventional example can be adapted to perform lossy encoding.

The final image forming position phase information 111 is inputted to the lossless encoding unit 193 to be lossless encoded, to thereby be the lossless code 194. For example, a combination of a predictive coding and Huffman coding can be adapted to perform the lossless encoding.

The data amount of the pixel value information can be reduced by performing the lossy encoding. Further, the data amount of the image forming position phase information can be reduced by performing the lossless encoding since the redundancy remains.

Embodiment 9

In the case where the image forming position information described in the embodiments is not important in image quality, i.e., in the case where the computer formed image is not overlapped, the image forming position information (barycenter, boundary position) is not encoded.

Alternatively, the important one among the upper edge, lower edge, right edge and left edge may be encoded.

A change-over is possible upon decoding by inserting in a code a flag for judging whether the image forming position is encoded or not.

According to the present invention, image information utilized for an apparatus for forming an image by an areal tone method is separated into density information of a minimum resolution that is visually significant and positional information where toner or ink is marked, to thereby performing encoding, whereby an amount of image data can greatly be reduced without deteriorating an image quality. Additionally, it is possible to integrally deal with image data in which both of gray-scale image information and binary image information are present.

Specifically, in the case where a resolution of an image inputted with a bit map is higher than a resolution upon printing in a conventional method, a band area is controlled to lower the resolution of the inputted image to the resolution upon printing to thereby perform an encoding for a raster image. However, there is a case that an image is a vector image such as a character graphic image even if the image is inputted with a bit map. The positional information is important for the character graphic image, and therefore the image quality is deteriorated when the resolution is simply lowered. It is necessary to possess a raster image with a resolution required for the character graphic image in order not to deteriorate the image quality.

According to the present invention, positional information to which toner or ink is marked is added to image information of a minimum resolution, whereby deterioration of an image quality can be controlled even if the resolution of the inputted image information is lowered to the necessary minimum resolution. Therefore, an amount of data can be reduced.

For example, a necessary minimum resolution is 200 dpi (200 dot/25.4 mm) as described in the Embodiment 4. Moreover, a detecting limit of a position where toner or ink is marked is 1600 dpi as a result of conversion by using the resolution. Further, if input image information is inputted with 400 dpi in the fast-scanning direction and slow-scanning direction, 96-bit is conventionally required for representing the entire image information without deteriorating the image quality, while 14-bit is enough in the present invention.

Moreover, overlapping is performed after returning to the binary image information of the areal tone, so that it can be dealt with only one plane, whereby it is not necessary to take three-plane configuration described in the Conventional Example 2. Therefore, it can be simply treated.

What is claimed is:

1. An image encoding apparatus comprising:

an areal data generator that generates, based upon image information, areal data representing an area of a mark outputted to an inside of a pixel having a size corresponding to a screen resolution; and a positional data generator that generates positional data representing a position of the mark inside the pixel, wherein the areal data and the positional data represent an encoded image information, and the positional data is not obtained in cases where the position of the mark does not matter.

2. The image encoding apparatus claimed in claim 1, wherein the positional data represents a barycenter of the mark.

3. The image encoding apparatus claimed in claim 1, wherein the positional data represents a predetermined position which is any one of a right edge, a left edge, an upper edge and a lower edge of the mark.

4. The image encoding apparatus claimed in claim 1, wherein a boundary of the mark is a straight line and the positional data represents the position and an angle of the straight line.

5. The image encoding apparatus claimed in claim 1, further comprising an encoder that performs lossy encoding of the areal data.

6. The image encoding apparatus claimed in claim 1, further comprising an encoder that performs lossless encoding of the positional data.

7. The image encoding apparatus claimed in claim 1, further comprising a calculator that measures a width of an image forming position and calculates a pixel value according to the measured width.

8. An image encoding apparatus comprising:

a first input part that inputs a gray-scale bit map image;

a second input part that inputs a computer-formed image;

a part that obtains, based upon the gray-scale bit map image, an area of a first mark in a pixel having a size corresponding to a screen resolution;

a part that obtains an area of a second mark in the pixel based upon the computer-formed image;

a part that obtains an area of a third mark by overlapping the area of the first mark and the area of the second mark;

a part that generates areal data representing an area of the third mark; and a part that generates positional data representing a position of the third mark, wherein image information is represented by the areal data and the positional data.

9. The image encoding apparatus claimed in claim 8, wherein the computer-formed image is a vector image.

10. The image encoding apparatus claimed in claim 8, wherein the positional data represents a barycenter of the mark.

11. The image encoding apparatus claimed in claim 8, wherein the positional data represents a predetermined position which is any one of a right edge, a left edge, an upper edge and a lower edge of the mark.

12. The image encoding apparatus claimed in claim 8, wherein a boundary of the mark is a straight line and the positional data represents the position and an angle of the straight line.

13. The image encoding apparatus claimed in claim 8, further comprising an encoder that performs lossy encoding of the areal data.

14. The image encoding apparatus claimed in claim 8, further comprising an encoder that performs lossless encoding of the positional data.

15. The image encoding apparatus claimed in claim 8, wherein the positional data is not obtained in case where the position of the mark does not matter.

16. An image encoding apparatus comprising:

an inputting part that inputs a gray-scale bit map image;

an areal data generator that generates, based upon the gray-scale bit map image, areal data representing an area of a mark in a pixel having a size corresponding to a screen resolution; and a positional data generator that generates, based upon the gray-scale bit map image, positional data representing a position of the mark in the pixel, wherein the areal data and the positional data represent an encoded gray-scale bit map image, and the positional data is not obtained in cases where the position of the mark does not matter.

17. An image encoding apparatus comprising:

an inputting part that inputs a computer-formed image;

an areal data generator that generates, based upon the computer-formed image, areal data representing an area of a mark in a pixel having a size corresponding to a screen resolution;

a positional data generator that generates, based upon the computer-formed image, positional data representing a position of the mark in the pixel, wherein the areal data and the positional data represent an encoded computer-formed image, and the positional data is not obtained in cases where the position of the mark does not matter.

18. An image encoding method, comprising the steps of:

generating, based upon image information, areal data representing an area of a mark outputted to an inside of a pixel having a size corresponding to a screen resolution;

generating positional data representing a position of the mark inside the pixel; and representing an encoded image information by the areal data, and the positional data and the positional data is not obtained in cases where the position of the mark does not matter.

* * * * *